United States Patent
Jordan et al.

(10) Patent No.: US 8,950,732 B2
(45) Date of Patent: Feb. 10, 2015

(54) TOILET DOLLY

(75) Inventors: David S. Jordan, Knoxville, TN (US); Michael C. Jordan, Knoxville, TN (US)

(73) Assignee: iTool Equipment Holding LLC, Knoxville, TN (US)

( * ) Notice: Subject to any disclaimer, the term of this patent is extended or adjusted under 35 U.S.C. 154(b) by 1054 days.

(21) Appl. No.: 12/931,074

(22) Filed: Jan. 24, 2011

(65) Prior Publication Data

US 2012/0187357 A1     Jul. 26, 2012

(51) Int. Cl.
*B62B 3/04* (2006.01)
*B62B 3/06* (2006.01)

(52) U.S. Cl.
CPC ............ *B62B 3/0606* (2013.01); *B62B 3/0625* (2013.01); *B62B 3/0643* (2013.01); *B62B 2202/80* (2013.01); *B62B 2203/10* (2013.01)
USPC .......................... 254/3 R; 254/2 B; 254/10 B

(58) Field of Classification Search
USPC ............................... 254/3 R, 2 B, 133 R, 134
See application file for complete search history.

(56) References Cited

U.S. PATENT DOCUMENTS

| | | | |
|---|---|---|---|
| 4,722,511 A | | 2/1988 | Chitwood |
| 5,716,183 A | * | 2/1998 | Gibson et al. ................. 414/451 |
| 6,752,379 B1 | | 6/2004 | Wall |
| 6,966,574 B1 | * | 11/2005 | Dahl ............................. 280/651 |
| 7,303,181 B1 | * | 12/2007 | Nymann ....................... 254/8 R |
| 7,823,862 B2 | * | 11/2010 | Wakil ............................ 254/8 R |
| 2012/0187357 A1 | * | 7/2012 | Jordan et al. .................. 254/3 R |

* cited by examiner

Primary Examiner — Lee D Wilson
(74) Attorney, Agent, or Firm — Michael E. McKee

(57) ABSTRACT

A toilet dolly for lifting a toilet from a floor includes a frame having a pair of spaced-apart members which are positionable on opposite sides of the toilet desired to be lifted from a floor, and a plurality of wheels enable the frame to be rolled into operative positional relationship with a toilet for purposes of lifting the toilet from the floor. A pair of spaced-apart linkage members are connected to the spaced-apart members for pivotal movement relative thereto, and the linkage members include bowl-lifting portions which are moved between lowered and raised conditions as the linkage members are pivotally moved relative to the frame structure. The lever assembly further includes a foot-engagable portion which enables a user to pivotally move the linkage members relative to the frame structure with his foot to thereby lift the toilet to an elevated condition above the floor.

15 Claims, 8 Drawing Sheets

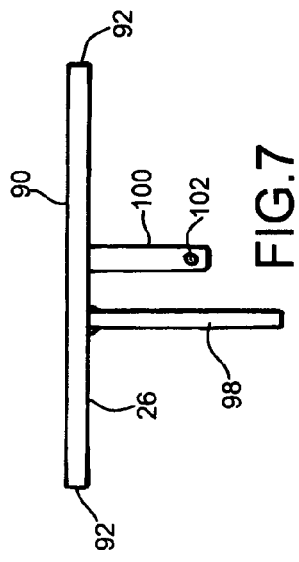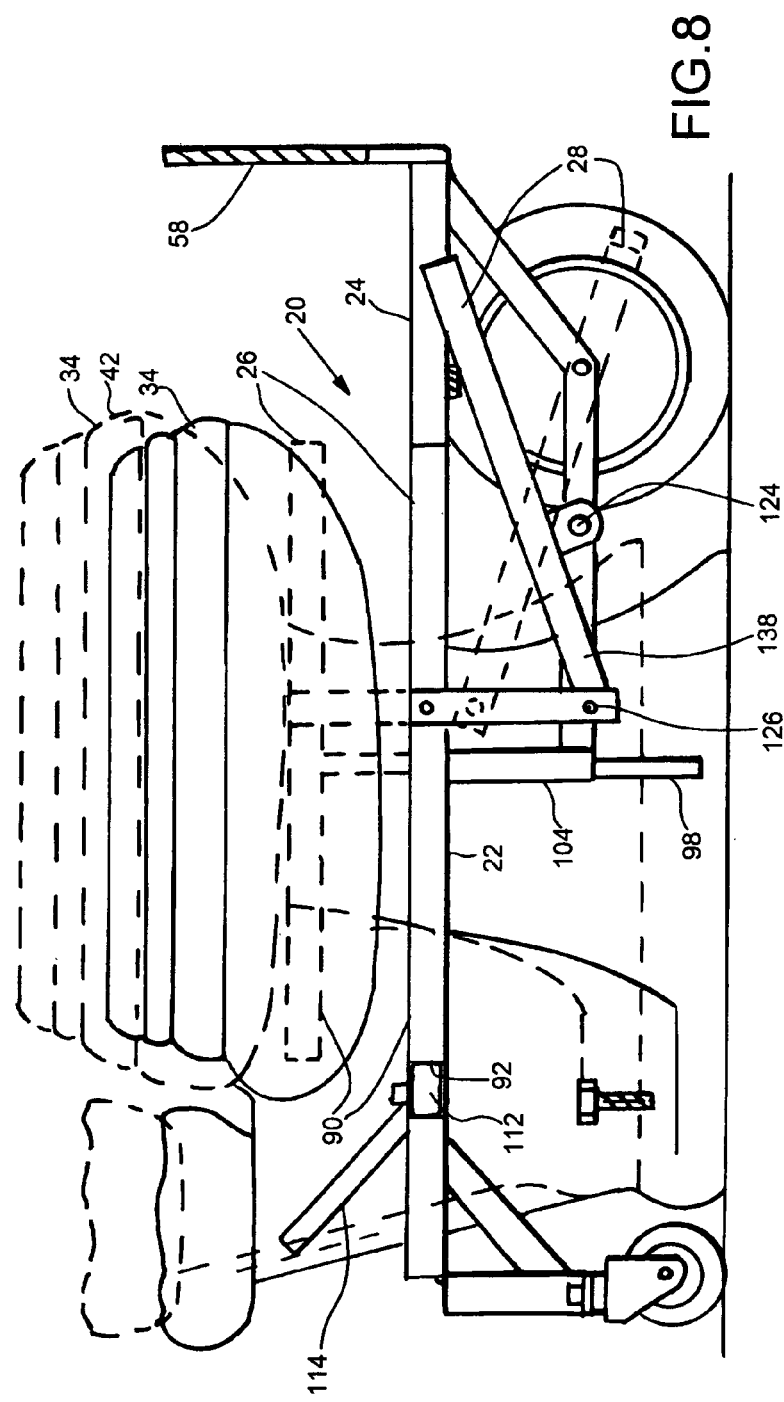

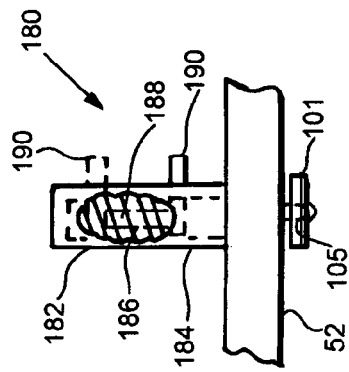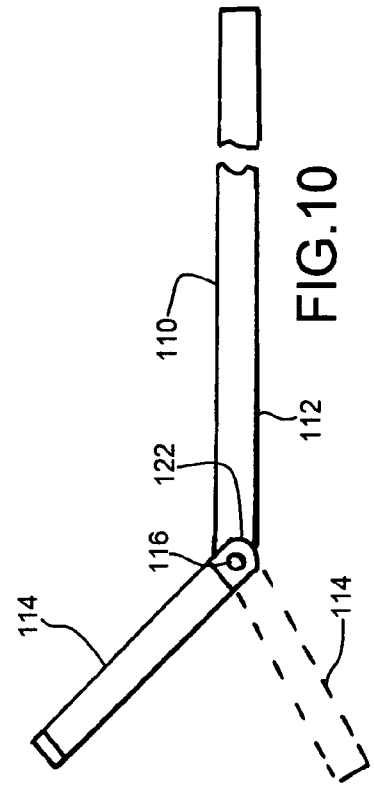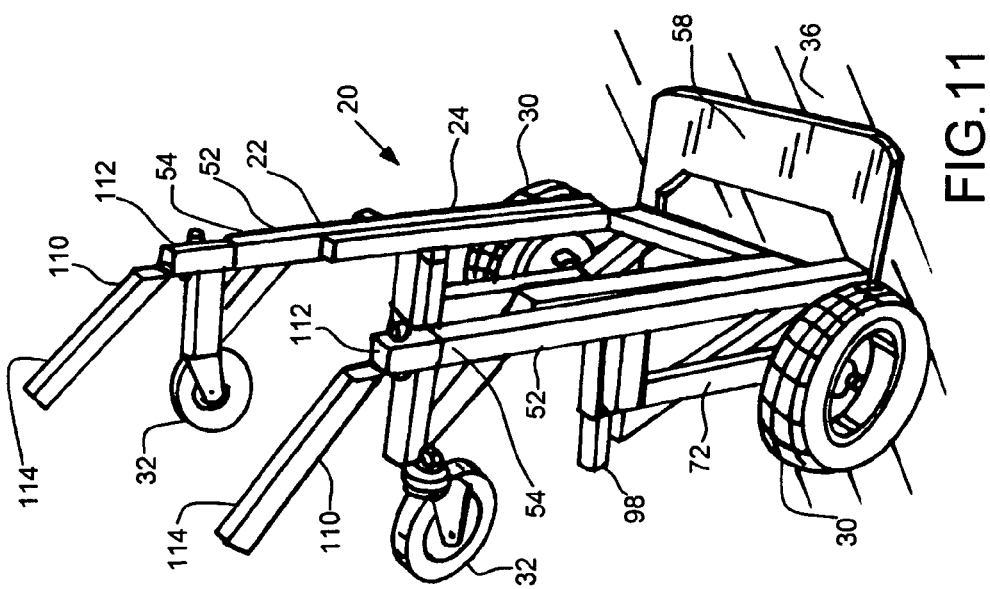

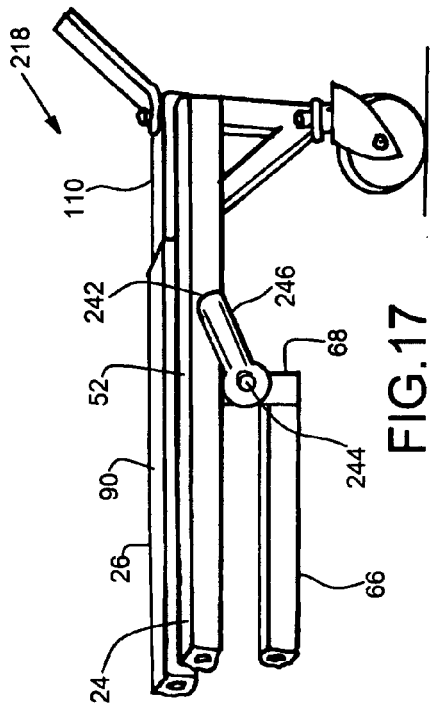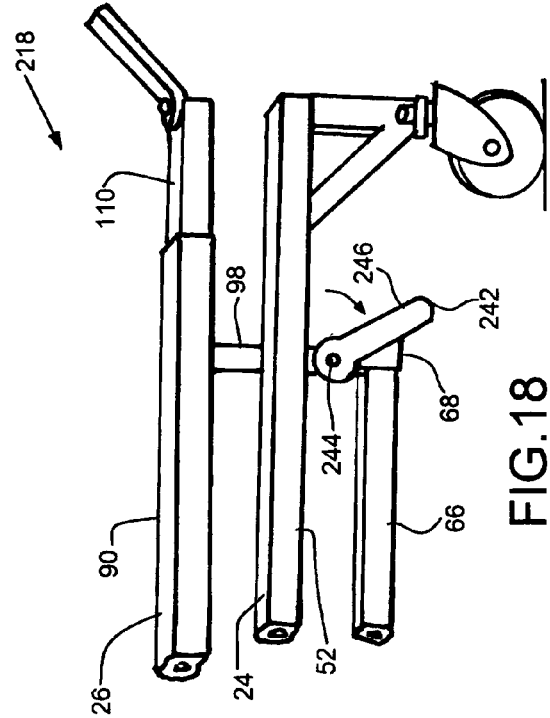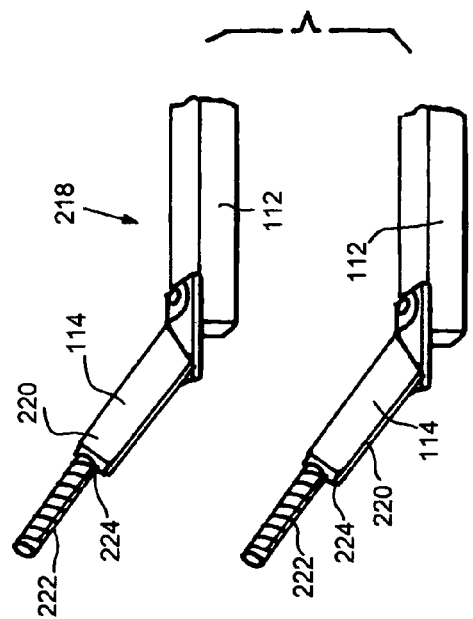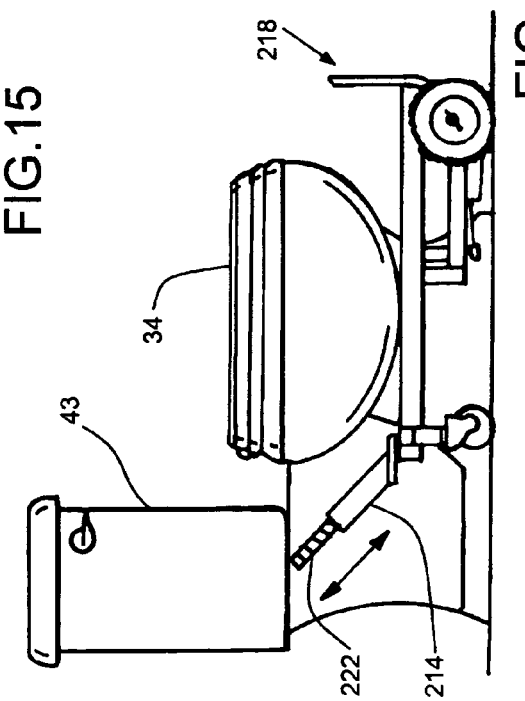

TOILET DOLLY

BACKGROUND OF THE INVENTION

This invention relates generally to lifting and transport apparatus and relates, more particularly, to an apparatus intended for lifting and transporting a toilet.

When installing a new toilet in place, re-installing an old toilet or in order to work in a bathroom, it is necessary to pick up and move the toilet from one site to another site. Of course, the lifting and moving of a toilet is frequently a difficult operation because the shape of a toilet renders it difficult to grasp, and most toilets are relatively heavy.

Various apparatus are known which can be used for lifting and moving a toilet. Examples of such apparatus, such as are shown and described in U.S. Pat. Nos. 6,752,379 and 4,722,511, include a wheeled frame which can be rolled into place beneath a toilet and lifting mechanisms which can be raised to lift the toilet from the floor. Once lifted from the floor, the toilet is rolled across the floor by way of the wheeled frame to another location. To replace a toilet—once supported by the wheeled frame in a raised condition, the frame is repositioned at the site at which the toilet is desired to be located, and the lifting mechanisms are lowered to re-position the toilet in place.

Apparatus such as those described in the aforementioned patents are limited in that each is relatively cumbersome to use or requires a great deal of time to use. It would be desirable to provide a relatively uncomplicated apparatus for lifting and moving a toilet which can be used to quickly raise or lower a toilet relative to the underlying floor and to transport a raised toilet across the floor.

Accordingly, it is an object of the present invention to provide a new and improved apparatus for raising or lowering a toilet from a floor and for moving the toilet across the floor.

Another object of the present invention is to provide such an apparatus which can be used to raise or lower a toilet relatively quickly.

Still another object of the present invention is to provide such an apparatus which can be used with relative ease.

Yet another object of the present invention is to provide such apparatus which reduces the likelihood that a toilet being lifted and/or transported with the dolly will be damaged by the dolly during a lifting or transporting operation.

Yet another object of the present invention is to provide such an apparatus which can be used as a dolly in one, or substantially horizontal, orientation for raising and transporting a toilet and which can be used as a dolly in another, or substantially vertical, orientation.

A further object of the present invention is to provide such an apparatus which is uncomplicated in structure, yet effective in operation.

SUMMARY OF THE INVENTION

This invention resides in a dolly for lifting a toilet from a floor wherein the toilet includes a bowl.

The dolly includes a frame structure having a pair of spaced-apart side members which are positionable on opposite sides of the bowl of a toilet desired to be lifted from a floor and a plurality of wheels which are rotatably attached to the spaced-apart side members of the frame structure which enable the frame structure to be rolled into a positional relationship with a toilet so that the spaced-apart side members are disposed on opposite sides of the toilet bowl for purposes of lifting the toilet from the floor. The dolly also includes a lever assembly having a pair of spaced-apart linkage members which are positioned on opposite sides of the toilet bowl when the frame structure is rolled into operative relationship with the toilet and which are pivotally connected to the spaced-apart members for pivotal movement relative thereto. The linkage members include bowl-lifting portions which are moved between raised and lowered conditions as the linkage members are pivotally moved relative to the frame structure. Furthermore, the lever assembly includes a foot-engagable portion which is joined to the linkage members and is movable between an elevated condition and a lowered condition as the linkage members are pivotally moved relative to the frame structure to enable a user to pivotally move the linkage members relative to the frame structure with his foot and thereby move the bowl-lifting portions of the linkage members from the lowered condition to the raised condition for the purpose of lifting the toilet to an elevated condition above the floor.

BRIEF DESCRIPTION OF THE DRAWINGS

FIG. 7 is a side view of the secondary section of the frame structure of the FIG. 1 dolly, as seen from below in FIG. 6 and shown without the handle members being connected to the secondary section.

FIG. 8 is a side elevational view of the FIG. 1 dolly shown in operative relationship beneath a toilet for purposes of lifting the toilet from a floor.

FIG. 9 is a fragmentary plan view of the FIG. 1 dolly illustrating a pin assembly for releasably securing the secondary section in a raised condition.

FIG. 10 is plan view of one of the handle members of the FIG. 1 dolly.

FIG. 11 is a perspective view of the dolly of FIG. 1 shown positioned in an upright, or substantially vertical, orientation for use.

FIG. 15 is fragmentary perspective view of handle members of one more alternative embodiment of the dolly.

FIG. 16 is a side elevational view showing the dolly of FIG. 15 positioned beneath a conventional toilet in preparation of a toilet-lifting process.

FIGS. 17 and 18 are fragmentary perspective views of yet one more dolly which possesses an alternative arrangement for releasably locking the secondary section of the dolly in an elevated condition.

DETAILED DESCRIPTION OF AN
ILLUSTRATIVE EMBODIMENT

Figure 1:
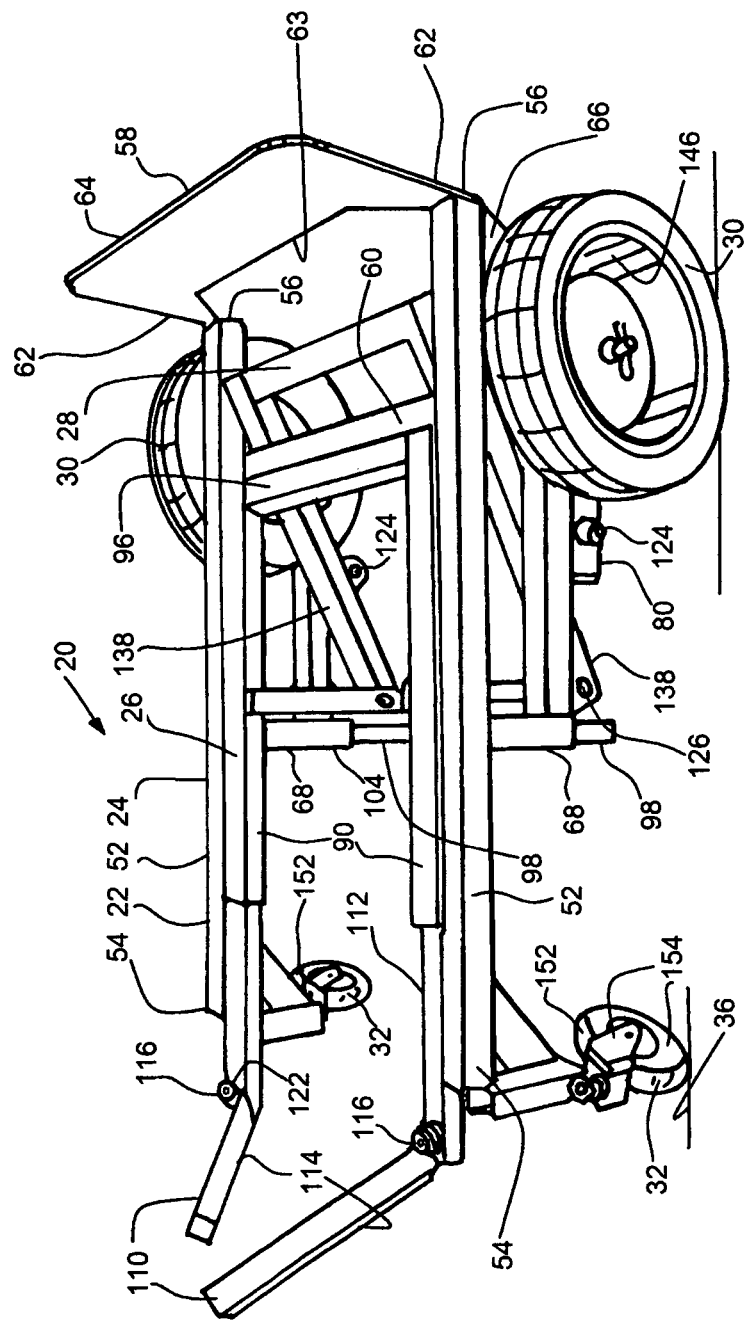
FIG. 1 is a perspective view of an embodiment of a toilet dolly within which features of the invention are incorporated and illustrating the dolly in a substantially horizontal orientation for purposes of lifting and moving a toilet.

Turning now to the drawings in greater detail and considering first FIG. 1, there is illustrated an embodiment, generally indicated 20, of a toilet dolly, or apparatus, within which features of the present invention are incorporated. The depicted dolly 20 includes a frame structure 22 having a primary section 24 and a secondary, or lift, section 26 which are connected to one another by way of a lever assembly 28. The primary section 24 is joined to the secondary section 26 in a manner which accommodates movement of the secondary section 26 relative to the primary section 24, and the movement of the secondary section 26 relative to the primary section 26 is effected as a user manipulates the lever assembly 28.

The dolly 20 also includes a plurality of wheel assemblies 30, 32 described herein, which are connected to the primary section 24 of the frame structure 22 for enabling the primary section 24 to be rolled, or wheeled, into an operative, or working, relationship beneath a toilet 34 (FIG. 2) as the toilet 34 rests upon a floor 36. By subsequently manipulating the lever assembly 28 so that the secondary section 26 is moved upwardly relative to the primary section 24, the secondary section 26 acts against the primary section 24 to lift the toilet 34 from the floor 36. Once lifted to a raised condition, the toilet 34 can be moved to an alterative site by rolling the dolly 20 along the floor 36.

Figure 2:
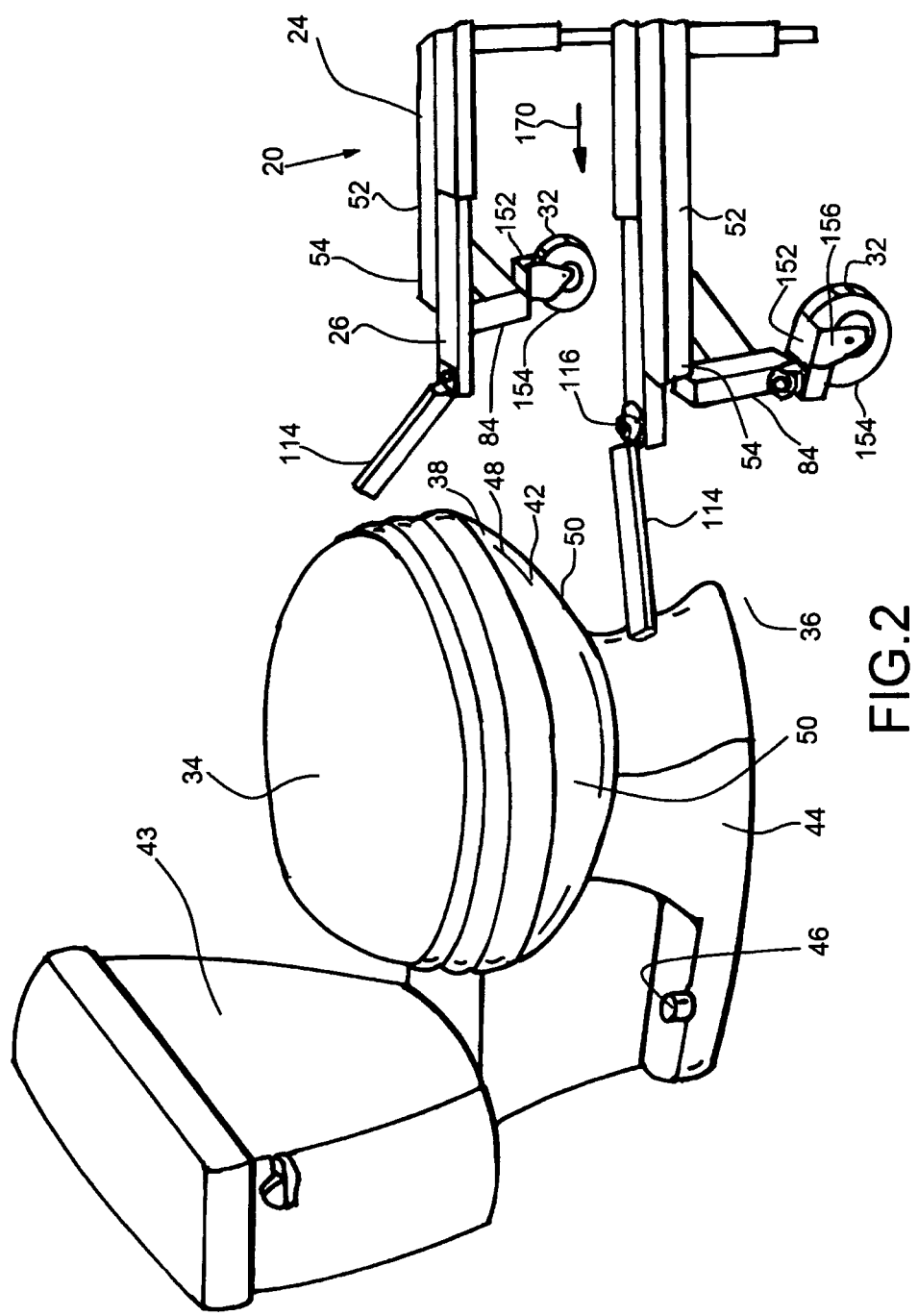
FIG. 2 is a perspective view of a conventional toilet of the class capable of being raised and moved with the FIG. 1 dolly and illustrating the dolly when positioned in front of the toilet.

With reference to FIG. 2, there is illustrated a conventional toilet 34 of the class capable of being lifted and moved with the dolly 20. Briefly, the toilet 34 is comprised of a bowl 42 and a tank 43 disposed behind the bowl 42. The bowl 42 includes a pedestal, or base 44, which rests upon a floor 36 and which has apertures through which bolts 46 (only one shown in FIG. 2) are directed for the purpose of bolting the toilet 40 to the floor 36. Furthermore, the bowl 42 has a front 38 and an upper portion 48 having two opposite (and curved) side surfaces 50 extending rearwardly along the bowl 42 from the front 38 and having portions which face somewhat downwardly. As will be described herein, these downwardly-facing portions of the side surfaces 50 are engaged and acted upon by the secondary section 26 of the dolly 20 during a lifting and moving operation performed with the dolly 20.

It will be understood that the dolly 20 can be positioned in a substantially horizontal orientation upon the floor 36 as illustrated in FIG. 1 for use of the dolly 20 for the purpose of lifting and transporting the toilet 34, and the dolly 20 can also be positioned in a substantially vertical, or upright, orientation as illustrated in FIG. 11 for use of the dolly 20 while the dolly 20 is disposed in the substantially vertical orientation. However and for purposes of the following description of the various components of the dolly 20, the dolly 20 will be presumed to be in its substantially horizontal orientation of FIG. 1. Therefore, when directional adjectives, such as "upper" or "lower" are used in conjunction with a component of the dolly 20, it will be understood that such directional adjectives are used with regard to the dolly 20 while it is oriented in the substantially horizontally-disposed orientation of FIG. 1.

With reference to FIGS. 1 and 3-5, the primary section 24 of the frame structure 22 includes a pair of spaced-apart and parallel side members 52, 52 having two opposite ends 54 and 56 and which are joined to one another adjacent the ends 54 with a foot plate 58 and a bar 60 which extends between the side members 52, 52. The foot plate 58 has lower edge portions 62 (as viewed in FIGS. 1 and 5) and an opposite upper edge portion 64, and it is the lower edge portions 62 which are joined to the ends 54 of the side members 52 so that the planar shape of the foot plate 58 is disposed at substantially a right angle to the parallel side members 52. As will be apparent herein, the lower edge of the foot plate 58 defines a cutout 63 therein to provide access to the lever assembly 28 with the foot of a user. In addition, the bar 60 spans the space between the side members 52 and is joined to each of the side members 52 along the underside thereof. As will be apparent herein, the bar 60 acts as a stop member for limiting the movement of the lever assembly 28 in one permitted (i.e. upward) direction relative to the primary section 24.

Figure 4:
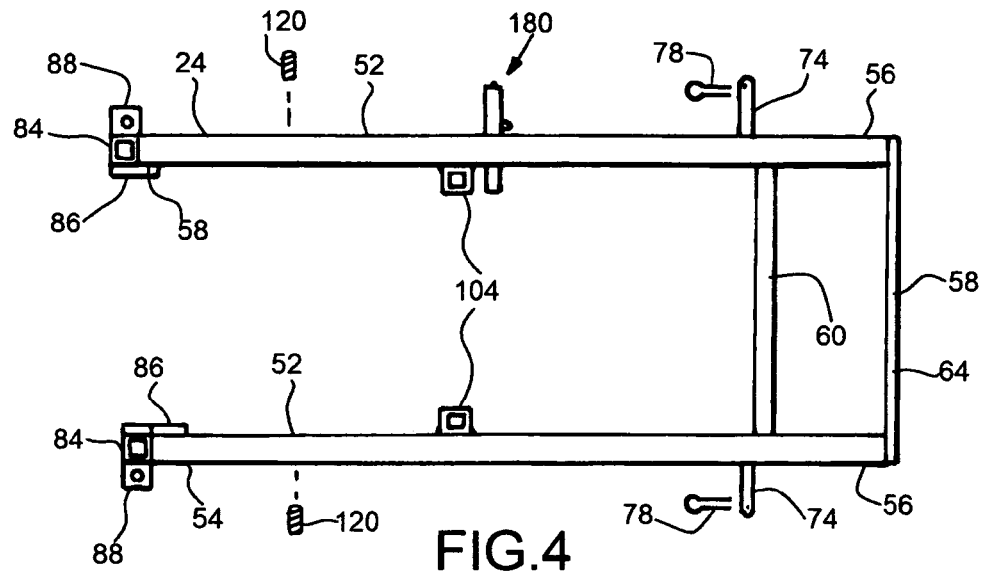
FIG. 4 is a plan view of the primary section of the frame structure of the FIG. 1 dolly, as seen generally from above in FIG. 1.

Also joined along each of the underside of the side members 52 is a C-shaped frame portion 66 having a forward arm 68 and a rearward arm 70 joined by a base 72. At the junction of the arm 68 and base 72 is joined an outwardly-directed pin 74 upon which a wheel assembly 30 is secured. For purposes of securing the wheel assembly 30 upon a corresponding pin 74, each pin 74 defines a through-aperture adjacent the free end thereof for accepting a Cotter key 78 (FIG. 4).

Disposed along the underside of the base 72 of the frame portions 66 is a substantially rectangular-shaped boss 80 having a transversely-extending opening 82 defined therein. As will be apparent herein, it is the bosses 80 through which the lever assembly 28 is connected to the primary section 24 to accommodate a pivotal movement of the lever assembly 28 relative to the primary section 24.

For purposes of securement of the wheel assemblies 32 to the primary section 24, there is provided a downwardly-extending post 84 which is joined to each side member 52 so as to extend generally downwardly of (and at substantially a right angle with respect to) the side member end 54. A brace 86 is joined between each post 84 and the corresponding side member 52 to help rigidify the connection between the post 84 and the corresponding side member 52, and an apertured transversely-extending flange 88 is joined to the lower end of the post 84 to accommodate the securement of the wheel assemblies 32 to the primary section 24.

Figure 5:
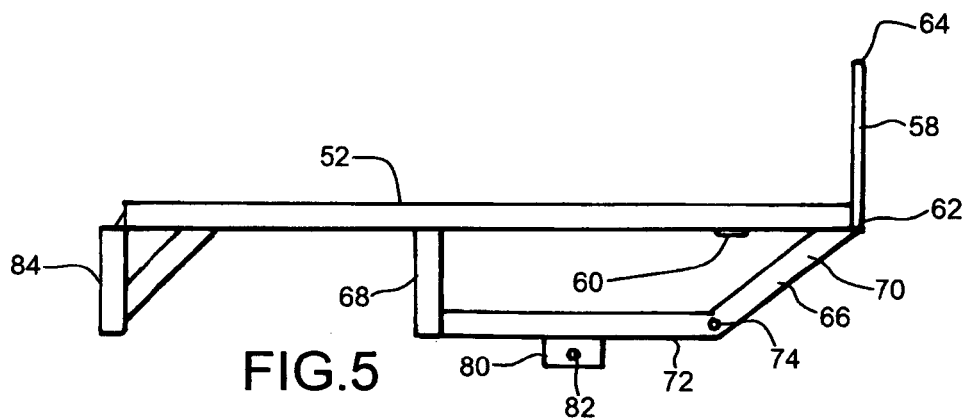
FIG. 5 is a side view of the primary section of the frame structure of the FIG. 1 dolly, as seen from below in FIG. 4.

It is a feature of the dolly 20 that as its secondary section 26 is raised or lowered with respect to the primary section 24, the movement of the secondary section 26 is guided by the cooperation between the primary and secondary sections 24, 26 along a substantially vertical path. To this end and as best shown in FIGS. 1, 4 and 5, the primary section 24 includes a pair of hollow guide tubes 104 wherein each tube 104 is joined along the inside edge of each side member 52 so as to extend generally downwardly therefrom at substantially right angle with respect thereto. The hollow interior of the guide tubes 104 provide a vertical guideway along which a guide member (described herein) of the secondary section 26 is slidably received for substantially vertical movement therealong. To enhance the securement of the guide tubes 104 to the remainder of the primary section 24, each guide tube 104 is preferably secured along the length of the forward arm 68 of a corresponding C-shaped frame portion 66.

Each of the side members 52, the posts 84 and guide tubes 104 are constructed of hollow steel channel stock having a substantially square cross section. Moreover, each of the foot plate 58, the bar 60 and braces 86 is also constructed of steel and are secured to its adjacent steel components with welds. Furthermore, the hollow end 54 of each side member 52 is left open to accommodate the placement of an end of a handle member 110 (described herein) having portions which can be inserted endwise therein.

With reference to FIGS. 1, 3, 6 and 7, the secondary section 26 of the frame structure 22 includes a U-shaped portion having a pair of elongated members 90 having two opposite ends 92, 94 and which are arranged in spaced-apart and parallel relationship with one another and are joined by a transversely-extending bar 96 which spans the space defined between the elongated members 90 and is joined (as with welds) to the ends 94 of the members 90. Each of the elongated members 90 and the bar 96 are constructed of hollow steel channel stock.

As mentioned earlier, the secondary section 26 is adapted to move upwardly and downwardly with respect to the primary section 24 as the lever assembly 28 is manipulated by a user. For the purpose of guiding the movement of the secondary section 26 along a substantially vertical path as the secondary section 26 is moved upwardly or downwardly as aforedescribed, there is attached a pair of linear guide members 98 which are each attached at its upper end to a corresponding elongated member 90 at a location disposed about midway between the ends 92 and 94 of the member 90 and oriented at substantially a right angle with respect thereto. Each linear guide member 98 is accepted by the upwardly-opening end of a corresponding guide tube 104 of the primary section 24. When assembling the secondary section 26 to the primary section 24, the lower ends of the linear guide members 98 are directed downwardly into the upwardly-opening ends provided in the guide tubes 104 until the elongated members 90 come to rest upon the upper ends of the guide tubes 104.

The secondary section 26 also includes a pair of linear connection bars 100, 101 which are each joined to a corresponding member 90 alongside the guide member 98 so as to extend at substantially a right angle with respect to the member 90. Moreover, the connection bar 100 and the linear guide member 98 associated with each elongated member 90 are arranged in spaced-apart and parallel relationship with respect to one another. Each bar 100 or 101 includes a through-opening 102 adjacent the lower end thereof which, as will be apparent herein, is used to pivotally join the secondary section 26 to the lever assembly 28, and one bar 101 is provided with an additional through-opening 105 used to releasably secure the secondary section 24 in its raised condition.

Figure 3:
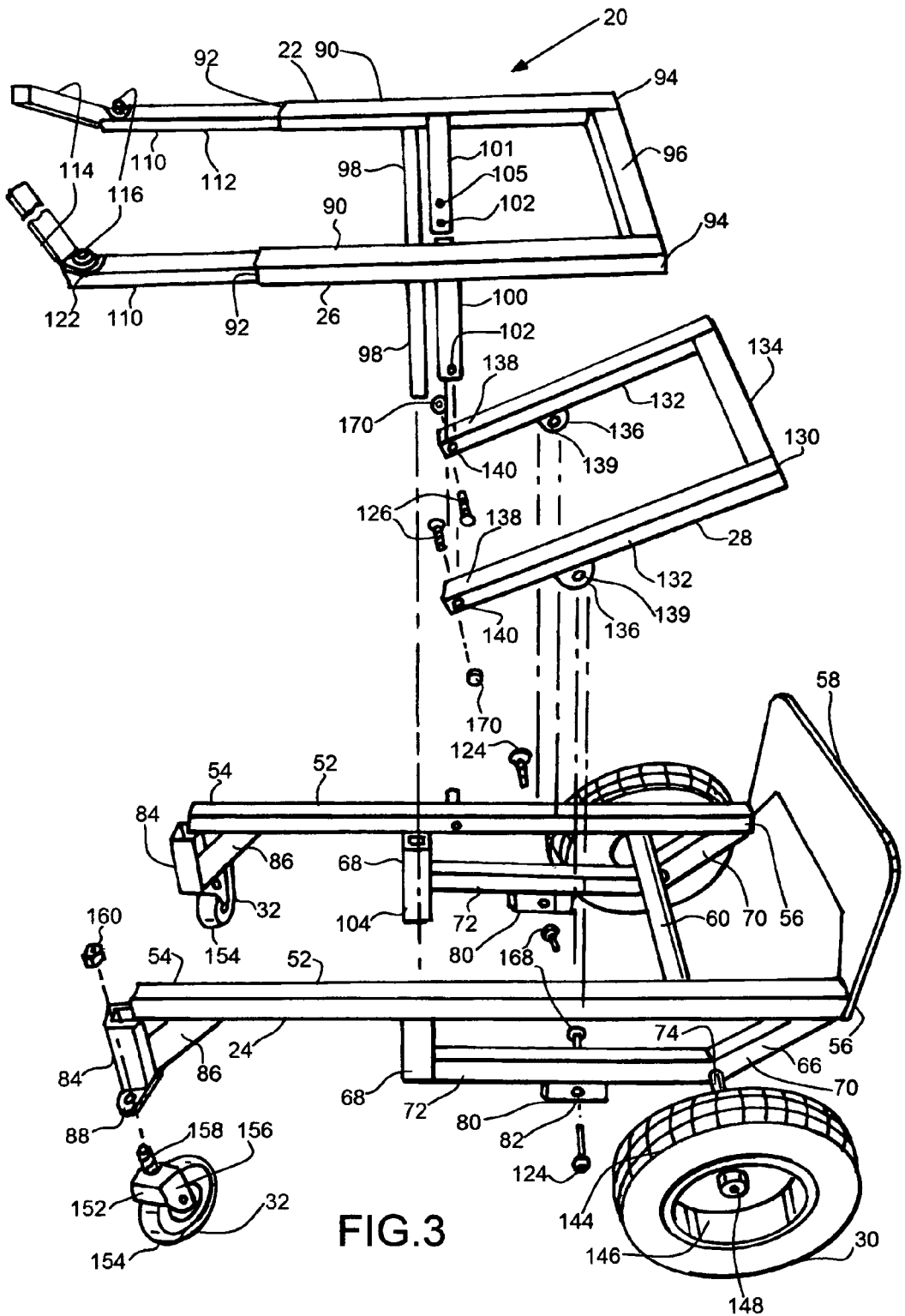
FIG. 3 is a perspective view of the FIG. 1 dolly, shown exploded.
Figure 6:
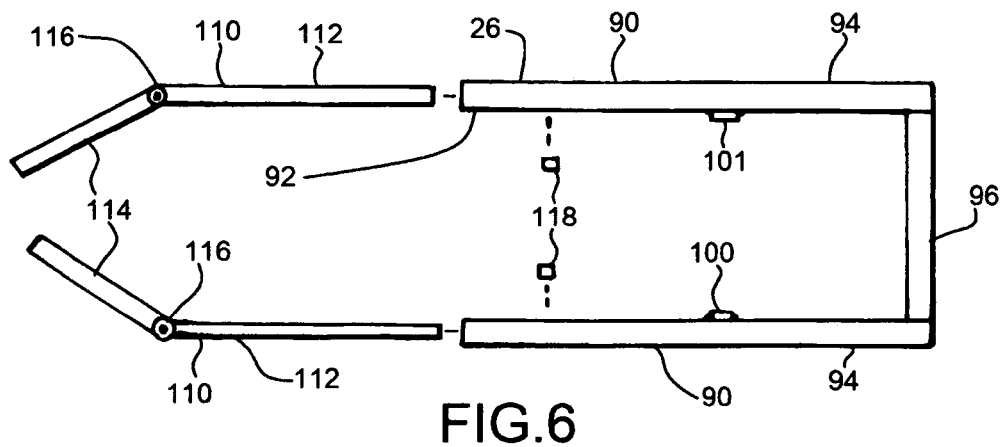
FIG. 6 is a plan view of the secondary, or lift, section of the frame structure of the FIG. 1 dolly, as seen generally from above in FIG. 1 and illustrating the handle members of the dolly.

With reference still to FIGS. 1, 3 and 6, the dolly 20 also includes a pair of handle members 110 which can be joined to the elongated members 90 of the secondary section 26 and, in the alternative, can be joined to the side members 52 of the primary section 24. To this end, each handle member 110 includes a linear bar portion 112 and a grip portion 114 which is pivotally joined to the bar portion 112 with a bolt 116. While each grip portion 114 (as well as the bar portion 112) is formed from a piece of square (steel) channel, each portion 114 is provided with an angularly-extending flange 122 through which a shank of the bolt 116 extends. It follows that each bar portion 112 is provided with an opening which is aligned with the aperture defined in a corresponding flange 122 through which the shank of a bolt 116 is secured. The free end of the bar portion 112 (i.e. the end of the bar portion 112 opposite the grip portion 114) is adapted to be slidably accepted by the (open) end 92 of a corresponding member 90 and can be secured at a desired position along the length of the elongated member 90 with an optional set screw 118 (FIG. 6) directed through an opening provided along a side of the elongated member 90 and tightened against a surface of the bar portion 112.

For a purpose which will be apparent herein and with reference to FIGS. 6 and 10, the handle members 110 can be pivoted about the bolts 116 and relative to the secondary section 26 (so as to be angled inwardly toward the longitudinal mid-plane of the dolly 20 as best shown in FIG. 6) between alternative positions relative to the bar portion 112. Furthermore and for use of the dolly 20 in its upright, or FIG. 11, orientation, the bar portions 112 are also capable of being slidably accepted by the (open) end of the side members 52 of the primary section 24 and can be secured at a desired position along the length thereof with an optional set screw 120 (FIG. 4) directed through an opening provided along a side of the side member 52 and tightened against a surface of the bar portion 112.

With reference again to FIGS. 1 and 3, the lever assembly 28 includes a U-shaped frame 130 having two linkage members 132, 132 and a base member 134 which are joined together at the corners of the U-shape of the frame 130. Attached to the underside of each linkage member 132 is a boss portion 136 having a through-opening 139 defined therein, and there is defined within the end portion (or bowl-lifting portion), indicated 138, of each linkage member 132 a through-opening 140. As will be apparent herein, the through-openings 139 of the boss portions 136 facilitate the connection of the lever assembly 28 to the primary section 24 by way of the through-openings 102 provided in the connection bars 100, 101 of the primary section 24 and a bolt 124, and the through-openings 140 of the end portions 130 facilitate the connection of the lever assembly 28 to the secondary section 26 by way of the through-openings 102, 102 provided in the bars 100, 100 and a bolt 126.

With reference still to FIGS. 1 and 3, each wheel assembly 130 includes a wheel 144 having a hub 146 through which a through-opening 148 is provided. When assembling the dolly 20, each wheel 144 is positioned upon a corresponding pin 74 joined to the C-shaped frame portions 66 as the through-opening 148 is directed over the end of the pin 74. The wheel 144 is thereafter secured upon the pin 74 with a Cotter key 78 (FIG. 4).

By comparison, each wheel assembly 32 is provided by a caster 152 having a wheel 154 which is rotatably mounted within a frame 156. Protruding upwardly from the frame 156 is a pin 158 (FIG. 3) which is capable of being accepted by the aperture provided in a corresponding flange 88 joined to the lower end of the post 84 of the primary section 24. When assembling the dolly 20, the pin 158 of each caster 152 is directed upwardly through the aperture of a flange 88 and secured therein with a suitable fastener, such as a nut 160 (FIG. 3). When the dolly 20 is positioned in its substantially horizontal, or FIG. 1, orientation, the wheel assemblies 30, 32 collectively support the remainder of the dolly 20 so that the side members 52 of the primary section 24 and the elongated members 90 of the secondary section 26 are oriented substantially horizontally and thus substantially parallel to the underlying floor 36.

When assembling the dolly 20, the wheel assemblies 30 and 32 are attached to the primary frame section 24 as aforedescribed, and the lever assembly 28 is connected to the boss portions 80, 80 of the primary section 24 with the bolts 124. To this end, the lever assembly 28 is positioned within the spacing provided between the side members 52 of the primary section 24 so that the through-openings 139 of the lever assembly 28 are aligned with the through-openings 82 provided in the boss portions 136. At that point, the shank of each bolt 124 is directed endwise through a corresponding set of the aligned through-openings 82 and 139. Each bolt 124 is secured therethrough with a nut 168 (FIG. 3) threaded upon the shank of the bolt 124 to thereby pivotally secure the lever assembly 28 to the primary section 26 about a first pivot axis which substantially coincides with the longitudinal axis of the shank of the bolt 124. It should be understood that when positioning the lever assembly 28 between the side members 52, 52 for securement to the boss portions 80, 80, the lever assembly 28 must be directed beneath the bar 60 at the primary section 24 for a reason which will be apparent herein.

The secondary section 26 can be thereafter connected to the primary section 24 and the lever assembly 28 by first directing the guide members 98 downwardly through the upwardly-opening ends of the guide tubes 104, 104. The lever assembly 26 can then be manipulated to align the through-opening 140 of each end portion 138 with the through-opening 102 defined in the lower end of the connecting bar 100 or 101. The lever assembly 28 can thereafter be pivotally secured to the bars 100 or 101 with the bolts 126 (FIG. 3) whose shanks can be directed endwise through the aligned through-openings 102 and 140, and each bolt 126 is secured therein with a nut 170 threaded upon the shank of the bolt 126.

It follows from the foregoing that the lever assembly 28 is connected to the primary section 24 for pivotal movement with respect thereto about the bolts 124 (i.e. a first axis of pivot), and the secondary section 26 is connected to the lever assembly 28 for pivotal movement with respect thereto about the bolts 126 (i.e. a second axis of pivot). Therefore, when the base portion 136 of the lever assembly 28 is moved upwardly and downwardly (as viewed in FIG. 1) relative to the primary section 24, the elongated members 90 of the secondary section 26 are slidably moved upwardly and downwardly relative to the primary section 24 as the guide members 98 are guided vertically along the guide tubes 104. It will also be understood that the elongated members 90 are maintained in a substantially horizontal orientation as the secondary section 26 is slidably moved upwardly or downwardly relative to the primary section 24. The guide member-accepting openings provided in the (upper ends of the) guide tubes 104 are large enough to accommodate any forward or rearward shifting of the guide members 98, 98 during a pivoting of the lever assembly 28 about the bolts 124.

To use the dolly 20 to lift a toilet 34 from a floor 36, any bolts 46 (and any plumbing associated with the toilet) must first be removed and/or disconnected from the toilet 34, and then the dolly 20 is positioned in front of the toilet bowl 42, as shown in FIG. 2, so that the U of the U-shaped frame 130 of the secondary section 26 opens toward the front 38 of the toilet 34. With the grip portions 114 pivoted relative to the bar portions 112 to an out-of-the way position and while maintaining the secondary section 26 in its lowered condition relative to the primary section 24, the dolly 20 is then directed beneath the bowl 42 of the toilet 34 from the front 38 thereof (i.e. in the direction indicated by the arrow 170 in FIG. 2) until the elongated members 90 are disposed directly beneath the downwardly-facing portions of the side surfaces 50 of the toilet bowl, as shown in FIG. 8. The bar portions 112 of the handle members 110 can thereafter be positioned along the length of the elongated members 90 and the grip portions 114 are manipulated (i.e. pivoted) appropriately to position the grip portions 114 directly beneath the tank 44 of the toilet bowl 42. This being accomplished, the subsequent raising of the secondary section 26 into engagement with the side surfaces 50 of the toilet bowl 42 moves the grip portions 114 upwardly into supportive engagement with the underside of the tank 43 of the toilet bowl 42 to reduce the likelihood of a rearward tipping of the toilet 34 when in its raised condition. Thus, the handle members 110, with its pivotable grip portions 114, provide stability during a toilet lifting and transporting operation and are advantageous in this respect.

With the secondary sections 26 and grip portions 114 positioned beneath the toilet bowl 42 in the aforedescribed relationship therewith, the user can press downwardly against the base member 134 of the lever assembly 28 with his foot to move the base member 134 downwardly and thereby pivot the lever assembly 28 about the bolts 124. This pivotal movement of the lever assembly 28 about the bolts 124 lifts the end portions 138 (i.e. the bowl-lifting portion) of the linkage members 132 from, for example, the lowered position illustrated in solid lines in FIG. 8 to, for example, the raised position illustrated in phantom in FIG. 8. The resulting lifting movement of the end portions 138 lifts the elongated members 90 of the secondary section 26 upwardly against the side surfaces 50 of the toilet bowl 42 so that the toilet 34 is lifted to, for example, the elevated condition as illustrated in phantom in FIG. 8. It will be understood that the cutout 63 provided in the foot plate 58 provides a user's foot with access to the base portion 138 of the lever assembly 28.

It will also be understood that until the base member 134 is pressed downwardly, the weight of the secondary section 26 maintains the secondary section 26 in a lowered condition at which the horizontal plane defined by the upper surfaces of the elongated members 90 is no higher than, and preferably substantially co-planar with, the level of the horizontal plane defined by the upper surfaces of the side members 52, 52. Furthermore and while the secondary section 26 rests in the aforedescribed lowered condition, the upper surfaces of the linkage members 132 of the U-shaped frame 130 of the lever assembly 28 engage and the underside of the bar 60 to maintain the foot-engagable portion, or base member 134, in a stationary, or "ready" condition for use. Therefore, the bar 60 acts as a stop member which limits the upward movement of the foot-engagable portion, or base member 134. The lower movement of the foot-engagable portion, or base member 134, is limited by the underlying floor 36.

With reference to FIGS. 1 and 9, it is another feature of the dolly 20 that it includes means, generally indicated 120, for releasably securing the secondary section 26, and thus the toilet 34, in the FIG. 8 raised (phantom-line) condition. In this connection, the releasably securing means 180 (best shown in FIG. 9) includes a spring-biased pin assembly 182 joined to one side of a side member 52 of the primary section 24 for cooperating with the opening 105 provided in the guide bar 101 of the secondary section 26 so that upon movement of the secondary section 26 to an elevated condition (with respect to the primary section 24) so that the opening 105 is aligned with the pin 186 of the pin assembly 182, the pin 186 of the assembly 186 moves into the opening 105 to secure the secondary section 26 in its elevated condition.

Although the pin assembly 182 can take any of a number of forms, the assembly 182 of the depicted dolly 20 includes a cylindrical housing 184 secured (e.g. welded) to one side of one of the side members 52 (FIG. 4) and a pin 186 which is slidably mounted within the housing 184 for movement through a pre-formed opening provided in the side member 52. A spring 188 is mounted within the housing 184 for acting between the head of the pin 186 and the housing 184 so that the free end of the pin 186 (i.e. the end of the pin 186 opposite the head thereof) is biased through the pre-formed opening provided in the side member. During movement of the secondary section 26 upwardly or downwardly with relative to the primary section 24, the free end of the pin 186 is permitted to slide along the outer surface of the connecting bar 101, but upon movement of the opening 105 into aligned relationship with the pin 186, the free end of the pin 186 moves through the opening 105 to thereby secure the secondary section 26, and thus the toilet 34 supported thereby, in its elevated condition.

It follows that removal of the free end of the pin 186 from its secured relationship with through the opening 105 of the connecting bar 101 permits the secondary section 26, and thus the toilet 34 supported thereby, to be lowered from the elevated condition. It may be desirable, however, for the user to maintain pressure upon the base member 134 of the lever assembly 28 with his foot upon withdrawal of the pin 186 from the opening 105 to reduce the rate of decent of the secondary section 26 toward its lowered position. The pin assembly 182 also includes a latch mechanism 190 which is joined to and extends from one side of the pin 186 and is accessible to a user through the housing 184 for enabling the user to slidably withdraw the pin 186 from the opening 105 of the connecting bar 101.

It also follows that upon movement of the connecting bars 100, 101 upwardly in conjunction with the upward movement of the secondary section 26 so that the opening 105 aligns with the pin 186 of the pin assembly 182, the pin 186 is moved (under the influence of the spring 188) through the opening 105 to thereby secure the lever assembly 28, and thus the secondary section 26 and the toilet 34 supported thereby, in a fixed and elevated position relative to the primary section 24. With the toilet 34 supported as aforedescribed in its FIG. 8 elevated condition, the toilet 34 can be moved to an alternative site by manually rolling the dolly 20 along the floor 36. To replace the toilet 34 upon the floor 36 while the toilet 34 is supported in its raised condition upon the dolly 20, the dolly 20 is manually rolled to a position at which the toilet 34 is disposed directly above the location at which the toilet 34 is desired to be positioned. At that point, the base 134 of the lever assembly 28 is depressed by the foot of a user (to remove pressure from the pin 186) and then the pin 186 is manually withdrawn from the opening 105 enabling the secondary section 26 (and thus the toilet 34) to be lowered to the FIG. 8 solid-line position. Upon return of the secondary section 26 to a lowered condition at which its components will clear the underside of the toilet bowl 42 when rolled from beneath the toilet bowl 42 and after pivotally moving the grip portions 114 of the handle members 110 relative to the bar portions 112 thereof to an out-of-the-way position, the dolly 20 can be rolled out from under the toilet bowl 42.

It follows from the foregoing that a dolly 20 has been described which can be used for lifting a toilet 34 from a floor 36 and for transporting the toilet 34 across the floor 34. The dolly 20 includes a frame structure 22 having a pair of spaced-apart members 52 which are positionable on opposite sides of the bowl 42 of a toilet 34 desired to be lifted from a floor 36. In addition, a plurality of wheels 30, 32 are rotatably attached to the spaced-apart members 52 of the frame structure 22 which enable the frame structure 22 to be rolled into operative relationship with the toilet 34 so that the spaced-apart members 52 are disposed on opposite sides of the toilet bowl 42 for purposes of lifting the toilet 34 from the floor 36. The dolly 20 also includes a lever assembly 28 having a pair of spaced-apart linkage members 132, 132 which are positioned on opposite sides of the toilet bowl 42 when the frame structure 22 is rolled into operative relationship with the toilet 34 and which are pivotally connected to the spaced-apart members 52 for pivotal movement relative thereto. The linkage members 132 have bowl-lifting (end) portions 138 which are moved between raised and lowered conditions as the linkage members 132 are pivotally moved relative to the frame structure 22, and the lever assembly further includes a foot-engagable portion, or base 134, which is fixedly joined to the linkage members 132 and is movable between an elevated condition and a lowered condition as the linkage members 132 are pivoted relative to the spaced-apart members 52 of the frame structure 22 to enable a user to pivotally move the linkage members 132 relative to the frame structure 22 with his foot and thereby move the bowl-lifting portions 138 of the linkage members 132, 132 from the lowered condition to the raised condition for the purpose of lifting the toilet 34 to an elevated condition above the floor 36.

Another advantage provided by the dolly 20 and mentioned earlier is that it can also be used while oriented in a substantially upright orientation, as illustrated in FIG. 11. When it its upright position of FIG. 11, the dolly 20 is prevented from falling forwardly by the foot plate 58. Moreover and in contrast with the substantially horizontally-oriented arrangement of the elongated side members 52 of the primary section 24 of the frame structure 22 (depicted in FIG. 1) at which the side members 52 collectively define a substantially horizontally-disposed support surface, the substantially vertically-oriented arrangement of the side members 52, 52 define a substantially vertical support surface against which a tall item, such as a tall box, can be leaned when using the dolly 20 in order to lift and move the tall item. It will be understood that to facilitate use of the dolly 20 when in its upright orientation, the bar portions 112, 112 of the handle members 110, 110 can be slidably removed from the open ends 92 of the elongated members 90 of the secondary section 26 and slidably inserted within the open ends 54 of the side members 52 as illustrated in FIG. 11 to enable the user to grasp the dolly 20 with the grip portions 114, 114.

It will be understood that numerous modifications and substitutions can be had to the aforedescribed embodiment 20 without departing from the spirit of the invention. For example, although the aforedescribed embodiment 20 has been shown and described as including a spring-biased pin assembly 182 for releasably securing the secondary section 26 in an elevated condition in relation to the primary section 24, an alternative embodiment of a dolly could possess a pin assembly which is manually moved between a secured and a release condition for securing the secondary section 26 in an elevated condition.

Figure 12:
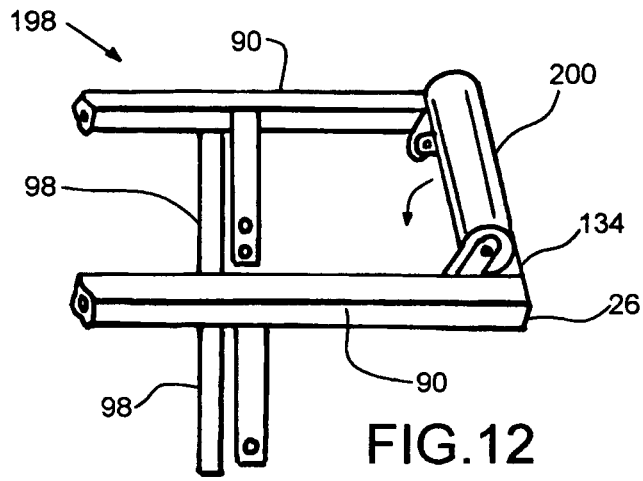
FIG. 12 is a fragmentary perspective view of a secondary section of a frame structure of an alternative embodiment of the dolly.
Figure 13:
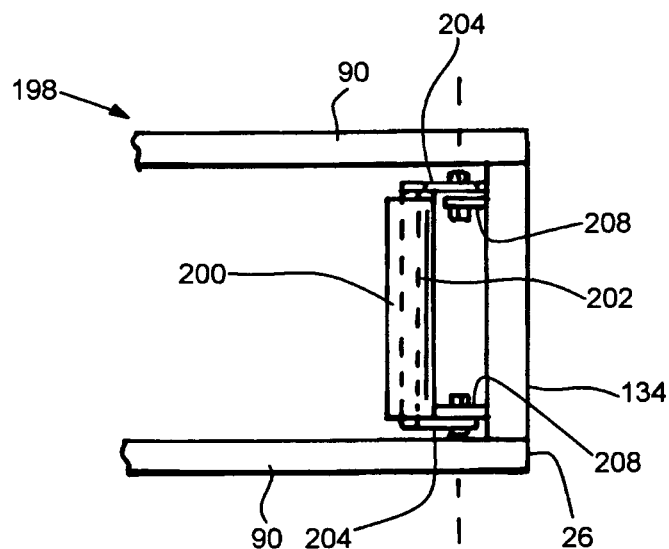
FIG. 13 is a plan view of the fragment of the secondary section of the frame structure as seen from above in FIG. 12 but showing the cushioned member in an alternative position.
Figure 14:
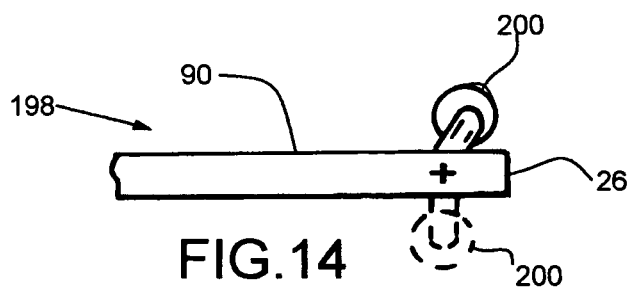
FIG. 14 is a side elevational view of the FIG. 13 fragment as seen generally from below in FIG. 13 but showing the cushioned member in another alternative position.

Furthermore, additional features can be incorporated within a dolly which are intended to reduce the likelihood of damage to a toilet during a toilet-lifting process. For example, there is illustrated in FIGS. 12-14 an alternative dolly 198 having an elongated bumper member 200 which is pivotally joined between the elongated members 90, 90 of the secondary section 26 adjacent the cross bar 96 for movement between a lowered, out-of-the-way position as viewed in phantom in FIG. 14 and a raised condition, as viewed in solid lines in FIG. 14, for use. In this connection, the bumper member 200 includes an elongated rod 202 and a pair of links 204 which are joined at the opposite ends of the bumper member 200 so as to extend therefrom. The rod 202 is covered by a thick layer 206 of relatively soft material, such as foam rubber, secured therearound.

As best shown in FIG. 13, the ends of the links 204 opposite the rod 202 are pivotally joined to bosses 208 which are, in turn, secured to the cross bar 96 to permit the rod 202 to be pivotally moved (manually) between the FIG. 14 phantom and solid-line positions. When the bumper member 100 is positioned in the elevated, or solid-line position of FIG. 14, and the dolly 20 is rolled into operative position beneath a toilet 34, the relatively soft material of the layer 206 is permitted to abut the front 38 of the toilet bowl 42 to thereby prevent damage to the front 38 of the toilet bowl 42 by the cross bar 96 of the secondary section 26 of the dolly 198.

Further still and as an alternative to the style of the handle members 110 depicted in the dolly 20 of FIGS. 1-11, the handle members could take the form of the handle members 220 of the dolly 218 depicted in FIGS. 15 and 16. Like the handle members 110 of the dolly 20, the handle members 220 include a grip portion 114 which is pivotally attached to a bar portion 112, but each of the depicted handle members 220 also includes a threaded rod 222 which is threadably received by an internally-threaded opening extending axially into the grip portion 114 from the free end, indicated 124, thereof. These threaded rods 222 have been found helpful in that once the dolly 218 has been positioned in place beneath a toilet 43 for toilet-lifting purposes, the rods 222 can be lengthened or shortened (relative to the grip portion 114) by rotating the rods 222 in an appropriate direction within its threaded openings so that upon raising the secondary section of the dolly 218 into engagement with the sides of the toilet bowl 34, the rods 222 supportedly engage the underside of the tank 43 of the toilet 34 to help steady the toilet during a toilet-lifting and/or transporting process.

Yet further still, a dolly in accordance with the present invention can employ an alternative means for releasably securing the secondary section 24 in an elevated condition with respect to the primary section 24. For example, there is illustrated in FIGS. 17 and 18 an embodiment of a dolly 240 having a rotatable set screw arrangement 242 which is connected to an arm 68 of the frame structure 66 of the dolly 218 for cooperating with the guide member 98 of the dolly 218 in order to releasably secure the secondary section 26 in an elevated condition. More specifically, the set screw arrangement 242 includes a set screw 244 which is threadably accepted within an internally-threaded opening provided in the arm 68 and an elongated handle member 246 which is joined to the head of the set screw 244 and extends (radially) away from one side thereof. Preferably, the set screw 244 is disposed within the arm 68 so that upon clockwise rotation of the handle member 246 through about one-quarter of a turn, the set screw 244 is tightened into snug-fitting relationship against the corresponding guide member 98 to thereby secure the section 26 in a desired vertical disposition relative to the arm 68.

During a toilet-lifting process performed with the dolly 218, the secondary section 26 can be raised relative to the primary section 24 to a desired elevated position and the handle member 246 can be thereafter rotated to releasably secure the secondary section 26, and thus a toilet lifted thereby, in an elevated condition. To return the raised toilet to a lowered position from a raised position, the set screw 244 is first loosened from its snug-fitting relationship with the guide member 98 and then the secondary section 26 is lowered relative to the primary section 24.

Accordingly, the aforedescribed embodiment 20 is intended for the purpose of illustration and not as limitation.

The invention claimed is:

1. A dolly for lifting a toilet from a floor wherein the toilet includes a bowl, the dolly comprising:
 a frame structure having a pair of spaced-apart side members which are positionable on opposite sides of the bowl of a toilet desired to be lifted from a floor;
 a plurality of wheels which are rotatably attached to the spaced-apart side members of the frame structure which enable the frame structure to be rolled into a positional relationship with a toilet so that the spaced-apart side members are disposed on opposite sides of the toilet bowl for purposes of lifting the toilet from the floor;
 a lever assembly having a pair of spaced-apart linkage members which are positioned on opposite sides of the toilet bowl when the frame structure is rolled into said positional relationship with the toilet and which are pivotally connected to the spaced-apart side members for pivotal movement relative thereto, the linkage members having bowl-lifting portions which are moved between raised and lowered conditions as the linkage members are pivotally moved relative to the frame structure, and the lever assembly further including a foot-engagable portion which is joined to the linkage members and is movable between an elevated condition and a lowered condition as the linkage members are pivotally moved relative to the frame structure to enable a user to pivotally move the linkage members relative to the frame structure with his foot and thereby move the bowl-lifting portions of the linkage members from the lowered condition to the raised condition for the purpose of lifting the toilet to an elevated condition above the floor; and
 a pair of spaced-apart elongated members which are disposed on opposite sides of the toilet bowl when the dolly is disposed in said positional relationship therewith, and the bowl-lifting portions of the linkage members are interposed between the spaced-apart side members of the frame structure and the spaced-apart elongated members so that the movement of the bowl-lifting portions from the lowered condition to the raised condition moves the elongated members upwardly from a lowered position into engagement with the sides of the toilet bowl;
 wherein the elongated members are arranged in a substantially parallel relationship with respect to one another and to the underlying floor so that as the bowl-lifting portions of the linkage members are moved from the lowered condition to the raised condition, the spaced-apart elongated members are maintained in a substantially parallel relationship with the underlying floor; and
 wherein the spaced-apart side members define a support surface which is oriented substantially horizontally when the dolly is positioned in said positional relationship beneath a toilet bowl as aforedescribed, and the spaced-apart elongated members define a support surface which is no higher than the support surface defined by the side members when the spaced-apart elongated members are positioned in the lowered condition, and each of the side members has two opposite ends, and the dolly includes a substantially planar foot plate which is attached between the side members at one end thereof so as to span the space therebetween and so that the plane of the foot plate is oriented at substantially a right angle with respect to the plane of the support surface defined by the side members, and the wheels and the foot plate cooperate to support the dolly in an upright orientation upon a floor so that the support surface defined by the side members is oriented substantially vertically for use of the dolly in said upright orientation.

2. The dolly as defined in claim 1 wherein the spaced-apart side members of the frame structure are maintained in a stationary relationship with respect to the underlying floor during a toilet-lifting operation, and the lever assembly is pivotally connected to the spaced-apart side members for movement of the bowl-lifting portions about a substantially horizontally-disposed axis of pivot as the foot-engagable portion is moved between the elevated and lowered conditions during a toilet-lifting operation.

3. The dolly as defined in claim 1 wherein the bowl of a toilet to be lifted with the dolly has a front and the dolly includes a laterally-extending cross bar which joins the pair of spaced-apart elongated members across the front of the toilet bowl when the dolly is in said positional relationship with the toilet and further includes a layer of cushioning material positionable between the laterally-extending cross bar and the front of the toilet bowl for reducing the likelihood of damage to the front of the toilet bowl by the laterally-extending cross bar.

4. The dolly as defined in claim 3 further including a rod which spans the space between the spaced-apart elongated members and is pivotally connected thereto for movement between a raised position at which the rod is disposed between the front of the toilet bowl and the laterally-extending section and a lowered position at which the rod is disposed in an out-of-the-way position beneath the plane of the support surface defined by the side members, and the layer of cushioning material is secured about the rod.

5. The dolly as defined in claim 1 further including a guide tube which is arranged substantially at a right angle with respect to the underlying floor and a guide member which is slidably received by the guide tube for movement relative along the length thereof, and one of the guide tube and the guide member is fixedly joined to the spaced-apart elongated members and the other of the guide tube and the guide member is fixedly joined to the spaced-apart side members of the frame structure so that as the bowl-lifting portions of the linkage members are moved from the lowered condition to the raised condition, the movement of the elongated members is guided by the movement of the guide member along the length of the guide tube.

6. The dolly as defined in claim 1 wherein the foot-engagable portion spans the space defined between the linkage members and is disposed in a raised position when the bowl-lifting portion is positioned in the lowered condition so that as a user presses downwardly upon the foot-engagable portion with his foot, the bowl-lifting portion is moved from the lowered condition toward the raised condition.

7. The dolly as defined in claim 1 wherein the linkage members of the lever assembly are pivotally connected to the spaced-apart side members so that as the foot-engagable portion is urged downwardly from the elevated condition toward the lowered condition by the foot of a user, the bowl-lifting portions of the linkage members are moved from the lowered condition toward the raised condition and so that upon return of the bowl-lifting portions of the linkage members from the raised condition toward the lowered condition, the foot-engagable portion returns upwardly from the lowered condition toward the raised condition.

8. The dolly as defined in claim 7 wherein the dolly further includes a stop for preventing upward movement of the foot-engagable portion from the elevated condition.

9. A dolly positionable beneath the bowl of a toilet for lifting the toilet from a floor and for transporting the toilet across the floor wherein the toilet bowl has side surfaces having portions which face downwardly, the dolly comprising:
    a wheeled frame structure positionable beneath the bowl of a toilet and having a primary section which is maintained in a relatively stationary relationship with respect to the underlying floor during a toilet-lifting operation performed with the dolly;
    a pair of spaced-apart elongated members which are positioned beneath the downwardly-facing portions of the opposite side surfaces of the toilet bowl desired to be lifted and transported with the dolly and which are oriented substantially parallel to the floor which underlies the dolly; and
    a lever assembly having linkage members which are connected to the primary section of the frame structure about a first axis of pivot to permit pivotal movement of the lever assembly with respect to the primary section and which are connected to the pair of spaced-apart elongated members about a second axis of pivot to permit pivotal movement of the elongated members relative to the linkage members, and wherein the linkage assembly includes a foot-engagable portion which enables a user to pivotally move the linkage members relative to the primary section with his foot and thereby move the spaced-apart elongated members from a lowered condition to a raised condition and into engagement with the downwardly-facing portions of the bowl of the toilet for the purpose of lifting the bowl of the toilet to an elevated condition above the floor;
    wherein the primary section of the frame structure includes a pair of spaced-apart side members which are positioned on opposite sides of a toilet bowl when the dolly is positioned beneath a toilet bowl for a toilet-lifting operation, and the side members define a support surface which is oriented substantially horizontally when the dolly is positioned beneath a toilet bowl as aforedescribed, and the spaced-apart elongated members define a support surface which is no higher than the support surface defined by the side members of the primary section when the spaced-apart elongated members are positioned in the lowered condition; and
    wherein each of the side members of the primary section has two opposite ends, and the dolly includes a substantially planar foot plate which is attached between the side members at one end thereof so as to span the space therebetween and so that the plane of the foot plate is oriented at substantially a right angle with respect to the plane of the support surface defined by the side members, and the wheeled frame structure and the foot plate cooperate to support the dolly in an upright orientation upon a floor so that the support surface defined by the side members is oriented substantially vertically for use of the dolly in said upright orientation; and
    handle members having grip portions which are joined to the remainder of the dolly for aiding in the stabilization of the toilet when the toilet is lifted by the dolly or alternatively providing a user with hand grips for use of the dolly when the dolly is arranged in said upright orientation as aforesaid.

10. The dolly as defined in claim 9 further comprising means cooperating between the spaced-apart elongated members and the frame structure so that as the spaced-apart elongated members are moved from a lowered condition to a raised condition, the elongated members are maintained in a substantially parallel relationship with the underlying floor.

11. The dolly as defined in claim 10 wherein the cooperating means includes a guide tube which is arranged substantially at a right angle with respect to the underlying floor and a guide member which is slidably received by the guide tube, and one of the guide tube and the guide member is fixedly joined to the spaced-apart elongated members and the other of the guide tube and the guide member is fixedly joined to the primary section of the frame structure so that as the spaced-apart elongated members are moved between the lowered condition and the raised condition, the movement of the elongated members is guided by the movement of the guide member along the length of the guide tube.

12. The dolly as defined in claim 9 wherein the foot-engagable portion spans the space defined between the linkage members and is disposed in a raised position when the spaced-apart elongated members are positioned in a lowered condition so that as a user presses downwardly upon the foot-engagable portion with his foot, the spaced-apart elongated members are moved from the lowered condition toward the raised condition.

13. The dolly as defined in claim 9 wherein the dolly has two handle members, and each handle member includes a bar portion, and each of the side members and the spaced-apart elongated members have open ends for slidably accepting the bar portion of a corresponding handle member when inserted endwise therein, and the bar portions of the handle members are slidably accepted by the open ends of the elongated members when the dolly is used to lift a toilet and are slidably accepted by the open end of the side members of the primary section when the dolly is used while arranged in said upright position.

14. The dolly as defined in claim 13 wherein the toilet to be lifted from a floor includes a tank and each handle member has one grip portion, and each of the one grip portion is connected to a corresponding bar portion for pivotal movement with respect thereto to accommodate a positioning of the grip portion in such a relationship with the tank of the toilet so that when the bar portions are slidably accepted by the open ends of the spaced-apart elongated members and the elongated members are raised into engagement with the side surfaces of a toilet bowl, the grip members are positioned beneath the tank of the toilet to help stabilize the toilet when the toilet is lifted to an elevated condition.

15. The dolly as defined in claim 9 further including means for releasably locking the spaced-apart elongated members in a raised condition with respect to the primary section of the wheeled frame for releasably maintaining the toilet is an elevated condition.

* * * * *